(12) United States Patent
Pan et al.

(10) Patent No.: US 9,359,490 B2
(45) Date of Patent: Jun. 7, 2016

(54) NANO-SIZED DIENE-BASED POLYMER LATEX PARTICLES COMPRISING PARTICLES HAVING AVERAGE PARTICLE SIZE OF LESS THAN 30 NM

(75) Inventors: Qinmin Pan, Waterloo (CA); Garry L. Rempel, Waterloo (CA); Guangwei He, Coral Springs, FL (US)

(73) Assignee: University of Waterloo, Waterloo (CA)

( * ) Notice: Subject to any disclaimer, the term of this patent is extended or adjusted under 35 U.S.C. 154(b) by 4 days.

(21) Appl. No.: 13/392,117

(22) PCT Filed: Aug. 26, 2010

(86) PCT No.: PCT/IB2010/053844
§ 371 (c)(1),
(2), (4) Date: Jul. 6, 2012

(87) PCT Pub. No.: WO2011/024140
PCT Pub. Date: Mar. 3, 2011

(65) Prior Publication Data
US 2012/0270047 A1  Oct. 25, 2012

(30) Foreign Application Priority Data

Aug. 26, 2009 (EP) ..................................... 09168713

(51) Int. Cl.
| | |
|---|---|
| C08F 2/60 | (2006.01) |
| C08F 20/44 | (2006.01) |
| C08F 36/06 | (2006.01) |
| B32B 5/16 | (2006.01) |
| C08L 9/04 | (2006.01) |
| C08C 19/02 | (2006.01) |
| C08F 236/12 | (2006.01) |

(52) U.S. Cl.
CPC . *C08L 9/04* (2013.01); *C08C 19/02* (2013.01); *C08F 236/12* (2013.01); *Y10T 428/2982* (2015.01)

(58) Field of Classification Search
CPC .... C08F 236/04; C08F 236/12; C08F 236/14; C08F 238/00; C08C 19/02; C08L 9/04
USPC ...................... 526/335, 341, 340.1
See application file for complete search history.

(56) References Cited

U.S. PATENT DOCUMENTS

| | | | |
|---|---|---|---|
| 3,454,644 A | | 7/1969 | Dewhirst |
| 3,600,349 A | | 8/1971 | Stone |
| 4,001,163 A | * | 1/1977 | Matner et al. ................. 524/745 |
| 4,082,714 A | * | 4/1978 | Lo Scalzo et al. ............ 524/836 |
| 4,452,950 A | | 6/1984 | Wideman |
| 4,508,862 A | * | 4/1985 | Schmidt ....................... 524/157 |
| 5,039,737 A | | 8/1991 | Parker et al. |
| 5,057,581 A | | 10/1991 | Rempel et al. |
| 5,082,732 A | * | 1/1992 | Ueda et al. .................... 428/402 |
| 5,442,009 A | | 8/1995 | Parker et al. |
| 5,651,995 A | | 7/1997 | Oyama et al. |
| 5,705,571 A | | 1/1998 | Tsiang et al. |
| 5,770,660 A | | 6/1998 | Lightsey |
| 6,020,439 A | | 2/2000 | Ko et al. |
| 6,410,657 B1 | | 6/2002 | Ko et al. |
| 6,552,132 B2 | | 4/2003 | Belt et al. |
| 6,635,718 B2 | | 10/2003 | Belt et al. |
| 7,345,115 B2 | | 3/2008 | Rempel |
| 7,385,010 B2 | | 6/2008 | Rempel et al. |
| 2002/0112644 A1 | * | 8/2002 | Nakamura et al. ............. 106/401 |
| 2008/0132649 A1 | * | 6/2008 | Takahashi et al. ............ 525/339 |
| 2011/0178231 A1 | * | 7/2011 | Pan et al. ....................... 524/565 |

FOREIGN PATENT DOCUMENTS

JP            61083093 A2     4/1986

OTHER PUBLICATIONS

Antonietti et al., Polymerization in microemulsions—a new approach to ultrafine, highly functionalized polymer dispersions.*
Pavel, Microemulsion polymerization, J. of Dispersion Sci. and Technol., vol. 25, No. 1, pp. 1-16, 2004.*
Antonietti, Polymerization in microemulsions with metallosurfactants, Macromol. Rapid Commun. 15, 111-116 (1994).*
Chowdhury, Electron-beam-induced crosslinking of natural rubber/acrylontrile-butadiene rubber latex blends in the presence of ethoxylated pentaerythritol tetraacrylate used as a crosslinking promoter, Journal of Applied Polymer Science, vol. 103, Issue 2, p. 1206-1214 (2006).*
Dube et al., Mathematical modeling of emulsion copolymerization of acrylonitrile/butadiene, Ind. Eng. Chem. Res. 1996, 35, 4434-4448.*
Otto von Guericke University Magdeburg, MVT Lecture Series: Nanoparticle Technology, Production of monodisperse latex particles, 1997.*
Hui Wang, Preparation of functional polymer nanoparticles using semibatch microemulsion polymerization, PhD Thesis, 2012.*
Lin, Xinwang, "Hydrogenation of Nitrile-butadiene Rubber Latex with Diimide", Applied Catalysis A: General 276 (2004), pp. 123-128.
Lin, Xingwang, "Gel Formation in Diimide-Hydrogenated Polymers", Journal of Applied Polymer Science, vol. 96, (2005), pp. 1122-1125.
Meira, G.R. et al., "Particle Size Distribution of SBR and NBR Latex by UV-VIS Turbidimetry near the Rayleigh Region", Rubber Chemistry and Technology, 1996, vol. 69, No. 4, pp. 696-711.
Rajkiewicz, M. et al., "Particle Sizes of Polymer Latex Obtained in Polymerization of ABS, Synthesis and Test Methods"., Polimery, 1970, vol. 15, No. 4, pp. 181-185. *Figures 1, 3, 7*.
International Search Report from co-pending Application PCT/IB2010/053844,dated Dec. 21, 2010, 4 pages.

* cited by examiner

*Primary Examiner* — Holly Le

(57) ABSTRACT

The present invention refers to diene-based unsaturated polymer latex particles having a particle size measured as $d_{90}$-value of less than 60 nm and a method for their production. Methods for using the diene-based polymer latex as rubber and for conversion to hydrogenated polymers, with reduced gel formation, are also disclosed.

11 Claims, No Drawings

NANO-SIZED DIENE-BASED POLYMER LATEX PARTICLES COMPRISING PARTICLES HAVING AVERAGE PARTICLE SIZE OF LESS THAN 30 NM

FIELD OF THE INVENTION

The present invention relates to nano-sized diene-based polymer latex particles, a method for producing such particles and methods of using them as rubber and for conversion to hydrogenated polymers.

BACKGROUND OF THE INVENTION

Diene-based unsaturated polymers, for example nitrile butadiene rubbers, also known as NBR produced through polymerization of acrylonitrile and butadiene are well-known in the art. Processes for copolymerization of acrylonitrile and butadiene are described for example in U.S. Pat. Nos. 3,600,349 and 5,770,660. Depending on production conditions such polymers can be obtained as latex in aqueous medium. Unsaturated diene-based polymers such as NBR are used for a variety of purposes in industry, moreover processes for hydrogenating such unsaturated polymers are well-known in the art.

It has been known that carbon-carbon double bonds in diene-based polymers may be successfully hydrogenated by treating the polymer in an organic solution with hydrogen in the presence of a catalyst to produce their saturated polymers which have significantly improved end-use properties. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations, including catalysts based on cobalt, nickel, rhodium, ruthenium, osmium, and iridium. The suitability of the catalyst depends on the extent of hydrogenation required, the rate of the hydrogenation reaction and the presence or absence of other groups, such as carboxyl and nitrile groups, in the polymers.

Hydrogenation of diene-based polymers has been very successful, if organometallic catalysts or some special metal salt catalysts and high-pressure gaseous hydrogen are used. Such success has been realized in solution hydrogenation, bulk hydrogenation and direct latex hydrogenation. For the solution hydrogenation of a diene-based polymer, the polymer is first dissolved in an organic solvent and then hydrogenation is carried out; after the hydrogenation, post-treatment is applied to recycle the organic solvent and to recover the metal catalyst. In this field, there have been already many patents and patent applications filed in this area, such as U.S. Pat. Nos. 6,410,657, 6,020,439, 5,705,571, 5,057,581, and 3,454,644.

In direct latex hydrogenation, a catalyst is directly added into the latex of a diene-based polymer for the hydrogenation operation. Many diene based polymers, copolymers or terpolymers are made by emulsion polymerization processes and they are in a latex form when they are discharged from polymerization reactors. Therefore it is very desirable to directly hydrogenate a diene-based polymer in latex form which is receiving increasing attention in the recent decade. Many efforts have been made to realize such a process. U.S. Pat. No. 7,385,010 has disclosed a process of direct hydrogenating diene-based polymer latex by using organometallic catalysts and high-pressure gaseous hydrogen.

In bulk hydrogenation, a catalyst is directly mixed with a diene-based polymer or a catalyst is entrapped into the polymer, and then hydrogenation is applied. U.S. Pat. No. 7,345,115 teaches a process of using an organometallic catalyst and high-pressure gaseous hydrogen to hydrogenate bulk diene-based polymers at a temperature higher than 100 deg C., in which the polymer is directly mixed with the catalyst as particles.

A significant characteristic of the above processes is that they all involve catalysts in which a noble metal is involved, that they all require high-pressure hydrogen and that they may need a relatively long reaction time.

To avoid using these noble metals and avoid being operated under high-pressure, significant attention has been paid to the hydrogenation of C=C bonds using hydrazine or a derivative of hydrazine as a reducing agent together with an oxidant like oxygen, air or hydrogen peroxide. The hydrogen source to saturate the C=C bonds is then generated in-situ as a result of the redox reactions in which diimide is also formed as intermediate. In U.S. Pat. No. 4,452,950 the latex hydrogenation is performed using the hydrazine hydrate/hydrogen peroxide (or oxygen) redox system to produce diimide in situ. $CuSO_4$ or $FeSO_4$ is used as a catalyst. U.S. Pat. Nos. 5,039,737 and 5,442,009 provide a more refined latex hydrogenation process which treats the hydrogenated latex with ozone to break the cross-linked polymer chains which form during or after the latex hydrogenation using the diimide approach. U.S. Pat. No. 6,552,132 B2 discloses that a compound can be added before, during or after the latex hydrogenation to break crosslinks formed during the hydrogenation using the diimide hydrogenation route. The compound can be chosen from primary or secondary amines, hydroxylamine, imines, azines, hydrazones and oximes. U.S. Pat. No. 6,635,718 B2 describes the process for hydrogenating C=C bonds of an unsaturated polymer in the form of an aqueous dispersion by using hydrazine and an oxidizing compound in the presence of a metal compound containing a metal atom in an oxidation state of at least 4 (such as Ti(IV), V(V), Mo(VI) and W(VI)) as the catalyst. In Applied Catalysis A: General 276 (2004) 123-128 and Journal of Applied Polymer Science Vol. 96, (2005) 1122-1125 detailed investigations relating to the hydrogenation of nitrile butadiene rubber latex via utilization of the diimide hydrogenation route are presented which cover examining hydrogenation efficiency and degree of hydrogenation.

It has been found that there are side reactions at the interphase of the latex particles and within the polymer phase, which generate radicals to initiate the crosslinking of polymers in the latex form. Using radical scavengers did not show any evidence in helping to suppress the degree of gel formation. Although there are methods developed to reduce the crosslinking, the aforementioned diimide route still encounters gel formation problems, especially when high hydrogenation conversion is achieved. Therefore, the resulting hydrogenated rubber mass is difficult to process or is unsuitable for further use because of its macroscopic three dimensional cross-linked structure.

SUMMARY OF THE INVENTION

It was an object of the present invention to provide new diene-based unsaturated polymers which can easily be hydrogenated with reduced gel formation. A further object of the present invention was to provide processes for producing same unsaturated polymers.

The present invention provides new nanosized diene-based unsaturated polymer particles in latex form wherein the particles have a particle size measured as $d_{90}$-value of less than 60 nm, preferably less than 40 nm, more preferably less than 30 nm and most preferably 20 nm. In one embodiment the diene-based unsaturated polymer is an acrylonitrile/butadiene polymer.

Furthermore, the present invention provides a method for producing diene-based unsaturated polymers in latex form comprising
   a) polymerisation of at least one diene D and optionally at least one copolymerizable monomer A
   b) in an aqueous medium, preferably water,
   c) in the presence of a surfactant, preferably alkylsulfate, wherein
   d) diene D and optionally at least one copolymerizable monomer A are continuously, preferably in slow and steady feeding rate, charged into a reactor containing the aqueous medium, a polymerisation initiator and the surfactant.

In one preferred embodiment the diene D and optionally monomer A are added continuously and slowly. The length of the addition period depends on reaction conditions, which in principle does not allow the monomers D and A to be accumulated into droplets in the waster phase and usually is at least 10 minutes. In a further preferred embodiment an amount of less than 1% (in weight, based on the amount of water), preferably less than 0.1% (in weight, based on the amount of water) of unreacted diene D and optionally monomer A in the water phase in the reactor is maintained.

In a further preferred embodiment a small amount of a redox polymerization initiator is used, which is in the range of 0.0.5% to 5%, preferably 0.1%-1% in weight based on the total amount of the monomers.

For the purposes of the present invention the term "diene D and optionally at least one copolymerizable monomer A are continuously charged into a reactor" means that not the complete nor almost the complete amount of reactants are put together into the reactor at the very beginning of the reaction. The term includes feeding the reactants with essentially the same feeding rate and concentration including increasing and decreasing such rates. Furthermore, the term includes addition of the reactants in small portions during the reaction.

The process according to the present invention is useful for the production of nanosize particles according to the present invention having a $d_{90}$-diameter of less than 60 nm.

For the purposes of the present invention the $d_{90}$-diameter means that 90% of the particles have a diameter less than the value indicated.

DETAILED DESCRIPTION OF THE INVENTION

The diene-based latex particles are based on at least one diene monomer, preferably at least one conjugated monomer D. The diene D can be of any nature. In one embodiment ($C_4$-$C_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Special preference is given to 1,3-butadiene.

Suitable copolymerizable monomers A include acrylonitrile, methacrylonitrile, styrene, alphamethyl styrene, propyl acrylate, butyl acrylate, propyl methacrylate, butyl methacrylate, and unsaturated carboxylic acids selected from fumaric acid, maleic acid, acrylic acid and methacrylic acid.

According to the present invention, the conjugated diene D forms from about 15 to about 100% by weight of the carbon-carbon double bond containing polymer in the latex form. If copolymerizable monomers A are used and selected from styrene and alphamethyl styrene, the styrene and/or a methyl styrene monomer preferably forms from about 15 to about 60% by weight of the polymer. If the other copolymerizable monomers A are used and selected from acrylonitrile and methacrylonitrile, the acrylonitrile and/or methacrylonitrile monomer preferably forms from about 15 to about 50% by weight of the polymer, with the conjugated diolefin forming from about 50 to about 85% by weight of the polymer.

If other copolymerizable monomers A are used and selected from acrylonitrile and methacrylonitrile and additionally from an unsaturated carboxylic acid, the acrylonitrile or methacrylonitrile forms from about 15 to about 50% by weight of the polymer, the unsaturated carboxylic acid forms from about 1 to about 10% by weight of the polymer and the conjugated diolefin forms from about 40 to about 85% by weight of the polymer.

Preferred products include styrene-butadiene polymers of the random or block types, butadiene-acrylonitrile polymers and butadiene-acrylonitrile-methacrylic acid polymers.

Preferred butadiene-acrylonitrile polymers have an acrylonitrile content of from about 25 to about 45% by weight.

A particularly suitable copolymer to be used in the present invention is a nitrile rubber (also abbreviated as "NBR") this being a copolymer of an $\alpha,\beta$-unsaturated nitrile, particularly preferred acrylonitrile, and a conjugated diene, particularly preferred 1,3-butadiene and optionally one or more further copolymerizable monomers, such as $\alpha,\beta$-unsaturated monocarboxylic or dicarboxylic acids, their esters or amides.

As $\alpha,\beta$-unsaturated monocarboxylic or dicarboxylic acids in such nitrile rubbers preference is given to fumaric acid, maleic acid, acrylic acid and methacrylic acid.

As esters of $\alpha,\beta$-unsaturated carboxylic acids in such nitrile rubbers preference is given to using their alkyl esters and alkoxyalkyl esters. Particularly preferred alkyl esters of $\alpha,\beta$-unsaturated carboxylic acids are methyl acrylate, ethyl acrylate, propyl acrylate, n-butyl acrylate, tert-butyl acrylate, propyl methacrylate, n-butyl methacrylate, tert-butyl methacrylate, 2-ethylhexyl acrylate, 2-ethylhexyl methacrylate and octyl acrylate. Particularly preferred alkoxyalkyl esters of $\alpha,\beta$-unsaturated carboxylic acids are methoxyethyl (meth) acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

A preferred terpolymer according to the present invention is a terpolymer of acrylonitrile, 1,3-butadiene and a third monomer selected from the group consisting of fumaric acid, maleic acid, acrylic acid, methacrylic acid, n-butyl acrylate, and tert-butyl acrylate.

The synthesis of the polymer can be undertaken in latex form. The polymers to be produced according to the present invention are in nanoparticles in the latex.

The synthesis process of the present invention can be achieved with use of a chemical redox initiator, such as ammonium persulphate (APS). Further polymerization initiators include thermal initiators such as potassium persulfate, dialkylperoxides or azocompounds and redox initiators, for example alkylhydroperoxides such as diisopropylbenzine, p-menthane and pinane hydroperoxides, optionally in combination with cholated salts and suitable reducing agent.

The initiator can be used in small quantities. An amount of APS with respect to the total monomers is in the range of 0.0.5% to 5%, preferably 0.1%-1% in weight based on the total amount of the monomers.

The synthesis process of the present invention is preferably carried out with a surfactant, such as sodium dodecyl sulfate (SDS). The amount of the surfactant can be from about 0.1% to about 15%, preferably 0.1 to 1% in weight based on the total monomer amount used.

In a preferred embodiment of the present invention water is used as the medium. The amount of water is from about 2 times to about 30 times, preferably from 5 times to 10 times, in weight based on the amount of the monomers used.

The synthesis process of the present invention can be undertaken in a suitable reactor equipped with temperature regulating and monomer feeding and agitating means.

Generally, according to the present invention, the reaction temperature suitable for the present invention is from about 0° C. to about 100° C., preferably from about 15° C. to about 70° C.

According to a preferred embodiment of the present invention, during the course of the reaction, the reaction time is from about one quarter of an hour to about 100 hours, preferably from about 1 hour to 20 hours, depending on operational conditions.

According to a preferred embodiment of the present invention, during the course of the reaction, the monomer feeding time is from is from about one quarter of an hour to about 50 hours, preferably from about 1 hour to 10 hours, depending on operational conditions.

According to a preferred embodiment of the present invention, during the course of the reaction, after the monomer feeding is finished, an aging time is preferred and it is from about one quarter of an hour to about 50 hours, preferably from about 1 hour to 10 hours, depending on operational conditions.

According to a preferred embodiment of the present invention, when the reaction is complete, to the extent desired, the reaction vessel can be cooled (if applicable) and the polymer latex is obtained.

In a preferred embodiment the resulting latex may be blended with additives known in the art for example an antioxidant and may be transferred to coagulation and washing vessels with sufficient agitation to prevent agglomeration. Subsequently, the product may be fed into a final dewatering device, pelletized, coated with a partitioning agent and transferred to suitable dryers.

The polymerization may be performed in reactors known in the art. In one embodiment the reactor is at least one vessel provided with a stirrer, temperature sensing means for measuring the progress of the polymerization and at least one inlet for the continuous addition of the monomers. Furthermore, there are means to provide an adequate and continuous addition rate of the monomers regulating the flow rate to reactor volume ratio.

Nanosized diene-based polymers obtained according to the present invention can generally be used for the same technical applications as diene-based latex particles with a higher particle size as rubber or rubber intermediate showing improved properties with respect to the resistance to degradation by heat, oxygen, and ozone.

Furthermore, the nanosized diene-based latex particles, especially based on acrylonitrile and butadiene, can easily be hydrogenated for the production of for example hydrogenated NBR, known as HNBR.

EXAMPLES

The materials which were used in the reaction and analysis are listed in Table 1.

TABLE 1

Specification of the Materials

| Material | Supplier |
|---|---|
| Potassium persulfate (KPS, 98% purity) | Aldrich Chemical Company |
| Sodium dodecyl sulfate (SDS, 95% purity) | Sigma-Aldrich Company |
| Butadiene | LANXESS Inc. |
| Acrylonitrile | Aldrich Chemical Company |
| n-dodecyl mercaptan (n-DDM) | Aldrich Chemical Company |

The following Examples illustrate the scope of the invention and are not intended to limit the same.

Example 1

0.1 part of KPS, 0.5 parts of SDS, 0.05 part of n-DDM and 40 parts of water were put into a 300 mL stainless steel high-pressure reactor (Parr Instruments) equipped with a impeller stirrer, an addition tube and a thermal couple. After the temperature was raised to 85° C., the mixture of 1.5 parts of acrylonitrile and 3 parts of butadiene was added as small portions over a period of 150 min. After addition of the monomer mixture, the reaction mixture was kept at 80-85° C. for an additional 20 min before cooling to halt the reaction.

The solid content was determined by a weighing method and the z-average particle size was measured using a dynamic light scattering method with a 90Plus particle size analyzer (Brookhaven Instrument Corporation). The number average particle sizes were measured with a Natrac 150 instrument (Microtrac Inc.). The copolymer composition was measured using an IR technique. A Bio-Rad FTS 3000X spectrometer was used. The infrared samples were prepared by casting polymer films from MEK solution onto sodium chloride disks. The particle size of the polymer such obtained is 30 nm.

Example 2

The same conditions and procedures as described in example 1 were employed, except the reaction temperature was 90° C. and the reaction time was 35 min and aging time was 25 min. The particle size of resultant NBR was 19.3 nm.

Example 3

The same conditions and procedures as described in example 1 were employed, except the amount of n-DDM was 0.025 part, the reaction temperature was 70° C. and the reaction time was 135 min and aging time was 60 min. The particle size of resultant NBR was 19.1 nm.

Example 4

The same conditions and procedures as described in example 1 were employed, except the reaction temperature was 70° C. and the monomer feeding time was 180 min and aging time was 25 min. The particle size of resultant NBR was 23.5 nm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. Diene-based unsaturated polymer latex particles comprising acrylonitrile/butadiene polymer particles having a particle size, measured as $d_{90}$-value, of less than 30 nm.

2. A method for hydrogenation of diene-based unsaturated polymers, the method comprising hydrogenating the diene-based unsaturated polymer latex particles according to claim 1.

3. A rubber or rubber intermediate comprising the diene-based unsaturated polymer latex particles according to claim 1.

4. Diene-based unsaturated polymer latex particles comprising acrylonitrile/butadiene polymer particles having a particle size, measured as $d_{90}$-value, of less than 30 nm and prepared by polymerizing butadiene and acrylonitrile monomer in water in the presence of a surfactant, wherein the polymerizing comprises:
   continuously charging the butadiene and acrylonitrile monomer into a reactor containing water, a polymerization initiator, and the surfactant to polymerize the butadiene and acrylonitrile monomer into polymer particles; and
   during the reaction, maintaining in the reactor:
      an amount of less than 1% by weight, based on the amount of water, of unreacted butadiene and acrylonitrile monomer in the water phase; and
      an amount of 0.1% to 1% by weight, based on the total weight of the monomer, of the surfactant,
   wherein the resultant particles of acrylonitrile/butadiene polymers in latex form have a particle size, measured as $d_{90}$-value, of less than 30 nm.

5. A method for hydrogenation of diene-based unsaturated polymers, the method comprising hydrogenating the unsaturated acrylonitrile/butadiene polymer latex particles according to claim 4.

6. A rubber or rubber intermediate comprising the unsaturated acrylonitrile/butadiene polymer latex particles according to claim 4.

7. A method for producing diene-based unsaturated particles of acrylonitrile/butadiene polymers in latex form, the method comprising:
   polymerizing at least butadiene and acrylonitrile monomer in water and in the presence of a surfactant, wherein the butadiene and acrylonitrile monomer are continuously charged into a reactor containing water, a polymerization initiator and the surfactant, where an amount of less than 1% by weight, based on the amount of water, of unreacted butadiene and acrylonitrile monomer in the water phase is maintained in the reactor, wherein the resultant diene-based unsaturated particles of acrylonitrile/butadiene polymers in latex form have a particle size measured as $d_{90}$-value of less than 30 nm.

8. The method according to claim 7, wherein the butadiene is 1,3-butadiene.

9. The method according to claim 7, further comprising polymerizing the butadiene and acryionitrile monomer in the presence of the surfactant in an amount of 0.1% to 1% by weight based on the total weight of the monomer.

10. The method according to claim 7, wherein the polymerization initiator is a redox initiator.

11. The method according to claim 7, wherein the surfactant is an alkylsulfate.

* * * * *